(12) United States Patent
Yan et al.

(10) Patent No.: US 6,935,216 B1
(45) Date of Patent: Aug. 30, 2005

(54) BELT TENSIONING DEVICE

(75) Inventors: Gongpu Yan, Troy, OH (US); Anthony L. DeBrosse, Piqua, OH (US)

(73) Assignee: Premark FEG L.L.C., Wilmington, DE (US)

( * ) Notice: Subject to any disclaimer, the term of this patent is extended or adjusted under 35 U.S.C. 154(b) by 535 days.

(21) Appl. No.: 09/630,402

(22) Filed: Aug. 2, 2000

(51) Int. Cl.$^7$ .............................. B26D 7/26; F16H 7/14
(52) U.S. Cl. ..................... 83/731; 83/932; 474/115; 474/135
(58) Field of Search .................... 83/703, 932, 731, 83/591, 676; 474/133, 135, 113, 114, 115, 474/117

(56) References Cited

U.S. PATENT DOCUMENTS

| | | | | |
|---|---|---|---|---|
| 229,908 A | * | 7/1880 | Nunan | 83/591 X |
| 881,743 A | * | 3/1908 | Thomson | 105/106 |
| 1,071,334 A | * | 8/1913 | Pease | 83/731 X |
| 1,130,664 A | * | 3/1915 | Bryan | 83/676 X |
| 1,413,028 A | * | 4/1922 | Ireland et al. | 474/114 |
| 1,525,965 A | * | 2/1925 | Thomas | 83/591 X |
| 1,543,306 A | * | 6/1925 | Van Berkel | 83/591 X |
| 1,685,272 A | * | 9/1928 | Campbell | 83/676 X |
| 1,695,188 A | * | 12/1928 | Henkel | 83/676 X |
| 1,809,430 A | * | 6/1931 | Van Duyn | 83/591 X |
| 1,832,302 A | * | 11/1931 | Hobart et al. | 83/591 |
| 1,846,855 A | * | 2/1932 | Folk | 83/591 X |
| 1,878,033 A | * | 9/1932 | Van Hoorn | 83/591 X |
| 1,935,877 A | | 11/1933 | Hamerstadt | 248/656 |
| 2,108,306 A | * | 2/1938 | Cooper | 83/591 X |
| 2,341,992 A | * | 2/1944 | Craig | 474/115 |
| 2,368,848 A | * | 2/1945 | Krueger | 451/311 |
| 2,392,573 A | * | 1/1946 | Brock et al. | 180/54.1 |
| 2,563,120 A | * | 8/1951 | Klingens et al. | 83/591 X |
| 2,662,708 A | * | 12/1953 | Schmitt | 248/653 |
| 2,704,096 A | * | 3/1955 | Olsen | 83/703 |
| 2,704,463 A | * | 3/1955 | Hess | 83/591 X |
| 2,833,597 A | * | 5/1958 | Sloyan | 384/38 |
| 2,842,002 A | * | 7/1958 | Stegman | 474/69 |
| 3,768,324 A | * | 10/1973 | Vanderstegen-Drake | 474/115 |
| 3,848,437 A | | 11/1974 | Rottering | 68/12.23 |
| 4,050,339 A | * | 9/1977 | Soleri | 83/703 |
| 4,165,466 A | | 8/1979 | Stikkers | 290/3 |
| 4,260,125 A | | 4/1981 | Levine | 248/675 |
| 4,298,342 A | | 11/1981 | Clayton et al. | 474/110 |
| 4,416,648 A | | 11/1983 | Radocaj | 474/135 |
| 4,436,012 A | * | 3/1984 | Hochanadel | 83/703 |
| 4,618,336 A | | 10/1986 | Isobe et al. | 474/133 |
| 4,702,137 A | * | 10/1987 | Davidson et al. | 83/731 X |
| 4,914,331 A | | 4/1990 | Lewis | 310/90 |
| 4,922,151 A | | 5/1990 | Lewis | 310/91 |
| 5,271,742 A | | 12/1993 | Mitcham | 474/112 |
| 5,389,045 A | | 2/1995 | Lyons | 474/113 |
| 5,902,202 A | | 5/1999 | Guerra | 474/114 |
| 6,030,305 A | | 2/2000 | Hood | 474/109 |

(Continued)

Primary Examiner—Charles Goodman
(74) Attorney, Agent, or Firm—Thompson Hine LLP

(57) ABSTRACT

A belt tensioning device for shifting a pulley such that a belt passed around the pulley is tightened to a predetermined tension. The device includes a rod coupled to the pulley, a member coupled to and movable along the rod, and a spring that exerts a reactive force against the member when the member is moved in a first direction along the rod. The device further includes a spacer which engages the member to limit the advancement of the member in the first direction.

23 Claims, 8 Drawing Sheets

BELT TENSIONING DEVICE

BACKGROUND OF THE INVENTION

The present invention is directed to a belt tensioning device, and more particularly, to a device for tensioning a belt to a predetermined tension.

A variety of machines, mechanisms and other apparatuses use belt and pulley systems to transfer power between two or more rotating components. The belt in such a system is passed around two or more of the pulleys, and is preferably maintained at a specific, predetermined tension. The belt tension should be high enough that the belt does not slip and therefore efficiently transfers power between the pulleys, but the tension should not be so high as to overload the belt.

In food processing machinery, particularly slicers, the belt/pulley system is often located deep inside the frame of the slicer. Accordingly, it is desirable to easily, accurately and precisely tension the belt in the slicer to reduce the need to access the belt/pulley system.

SUMMARY OF THE INVENTION

The present invention is a belt tensioning device which adjusts a belt to a precise, repeatable tension. The invention also has relatively few parts, and is inexpensive. When using the present invention, the belt can be tensioned to a specified tension without the use of a gauge or other special tools. The invention can be used to accurately set the belt tension during assembly of the associated mechanism or machine. The invention can also be used to tension the belt in the field, for example after disassembling the machine for maintenance.

In a preferred embodiment, the invention is a belt tensioning device for shifting a pulley such that a belt passed around the pulley is tightened to a predetermined tension. The device includes a rod coupled to the pulley, a member coupled to and movable along the rod, and a spring that exerts a reactive force against the member when the member is moved in a first direction along the rod. The device further includes a spacer which engages the member to limit the advancement of the member in the first direction.

Other objects and advantages of the present invention will be apparent from the following description and the accompanying drawings.

DETAILED DESCRIPTION

Figure 1:
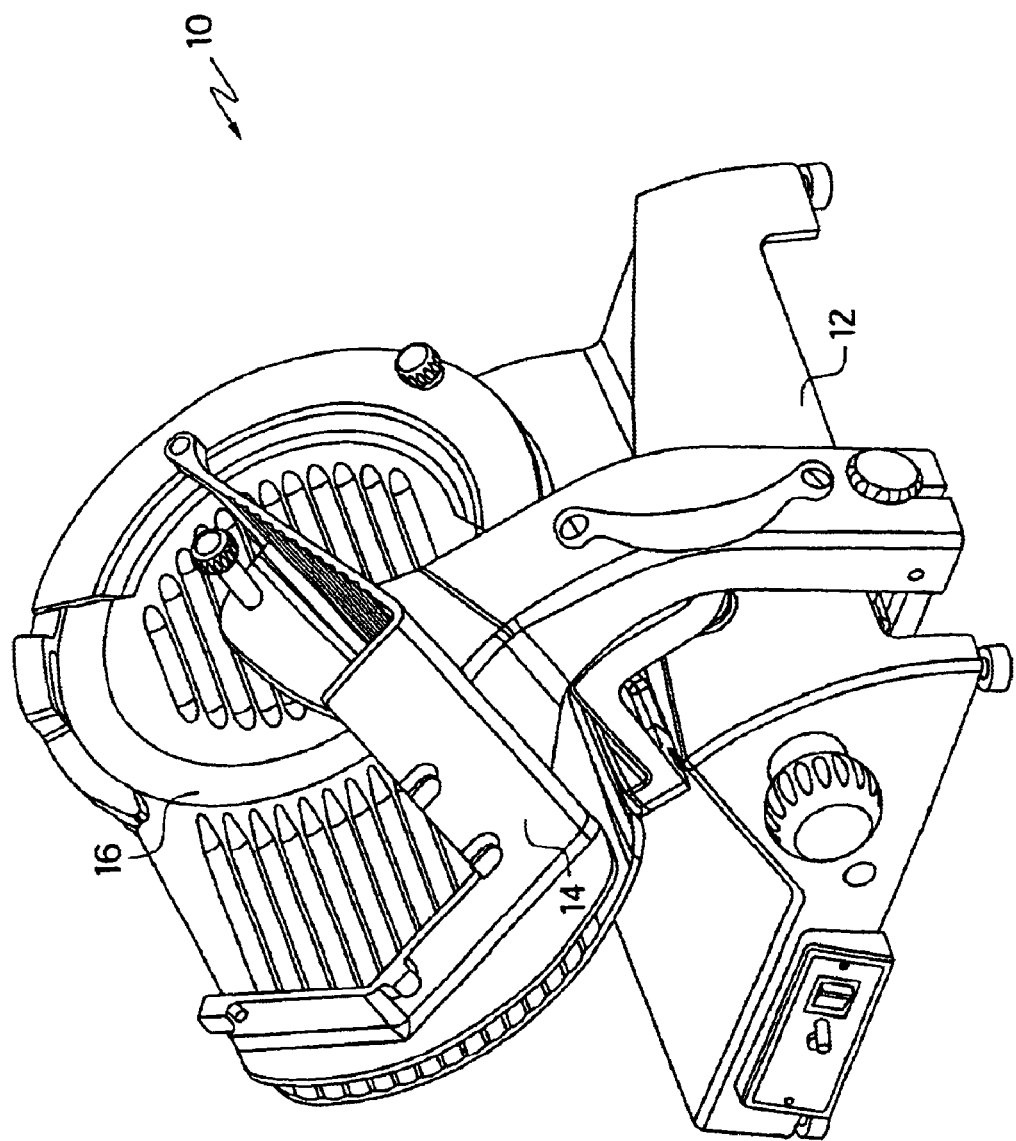
FIG. 1 is a perspective view of a slicer including the belt tensioning device of the present invention.
Figure 2:
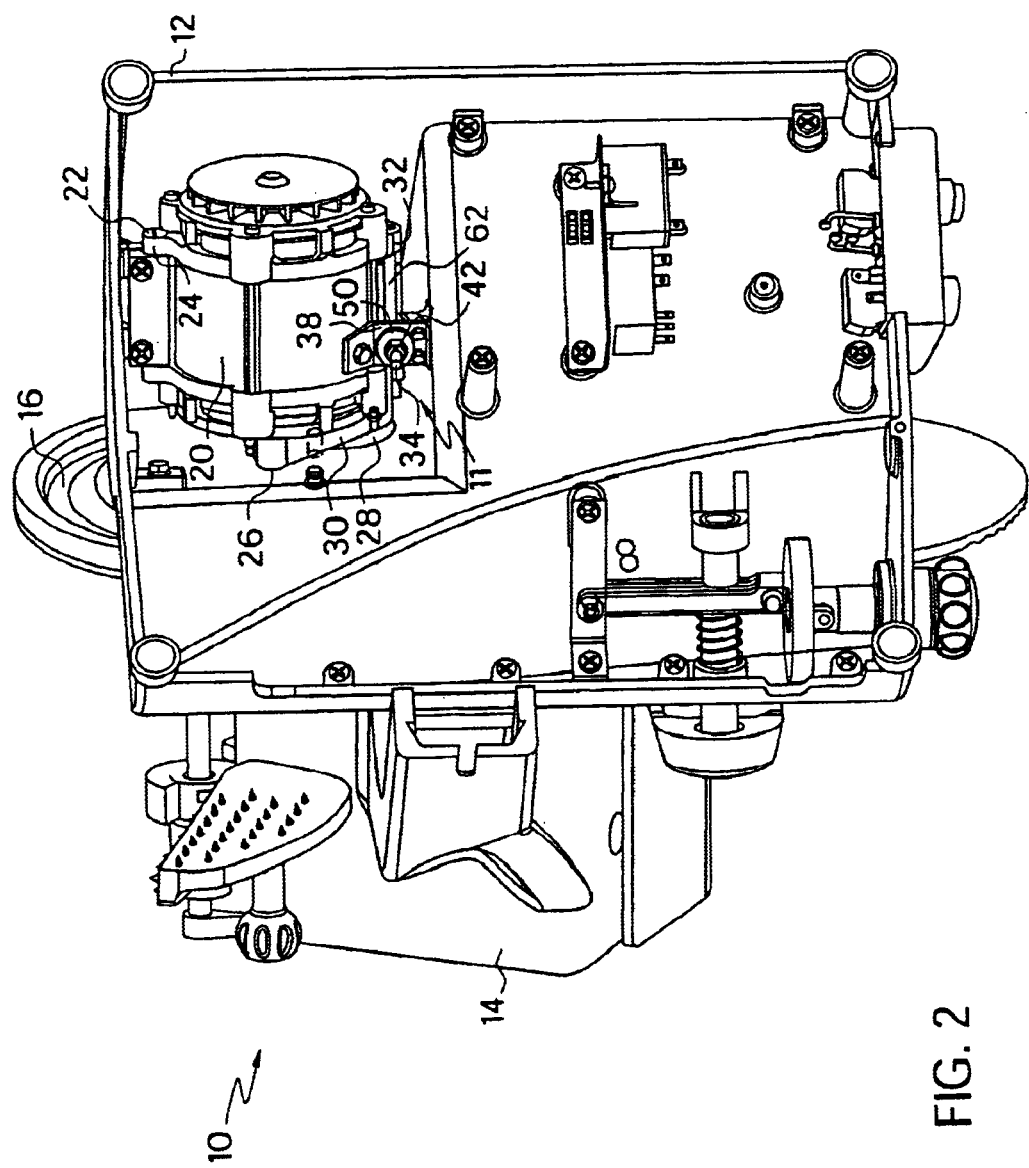
FIG. 2 is a bottom view of the slicer of FIG. 1, with part of the slicer removed to reveal part of the belt tensioning device of the present invention.

As shown in FIGS. 1 and 2, the belt tensioning device of the present invention can be used in a slicer, generally designated 10. The slicer 10 includes a slicer body 12 and a tray 14 for receiving a food product (not shown). The tray 14 is reciprocatingly mounted on the slicer body 12 to bring a food product located on the tray into and out of contact with a rotating blade 16. The slicer 10 also includes a motor for driving the blade 16.

As shown in FIGS. 2–5, the motor 20 of the slicer 10 is pivotally mounted about a pivot rod 22 by a bracket 24. The pivot rod 22 is preferably stationary and coupled to the body 12 of the slicer 10. The motor 20 includes an output pulley 26 that is rotatably driven by the motor, and the output pulley 26 is coupled to a driven pulley 28 by a belt 30. The driven pulley 28 is directly or indirectly coupled to the blade 16 such that rotation of the blade 16 is driven by the motor 20. The output pulley 26 may also drive various other components in the slicer 10, such as the reciprocation of the tray 14 or other functions.

Figure 3:
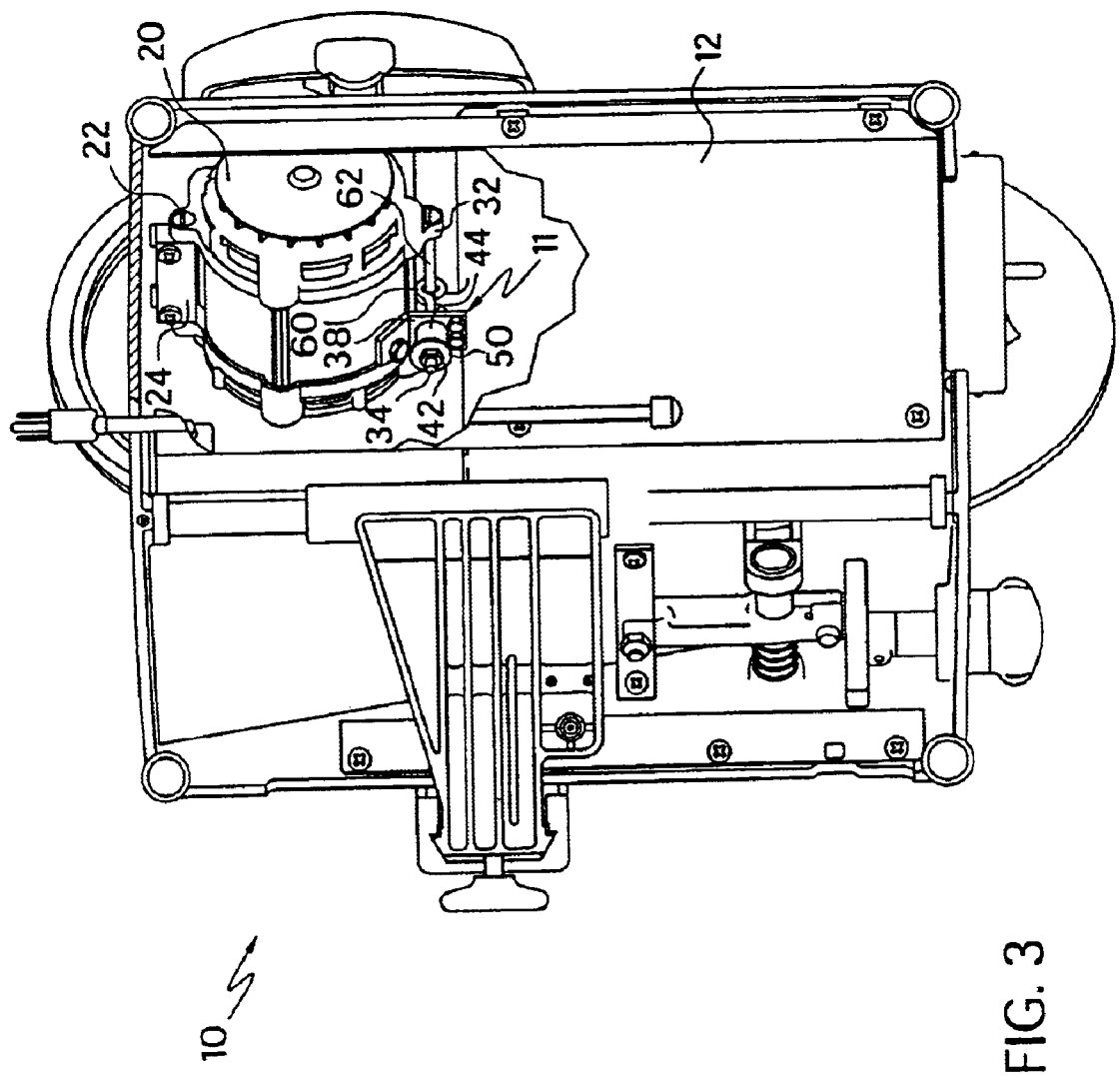
FIG. 3 is a partial cutaway bottom view of the slicer of FIG. 1, showing part of the belt tensioning device of the present invention.
Figure 4:
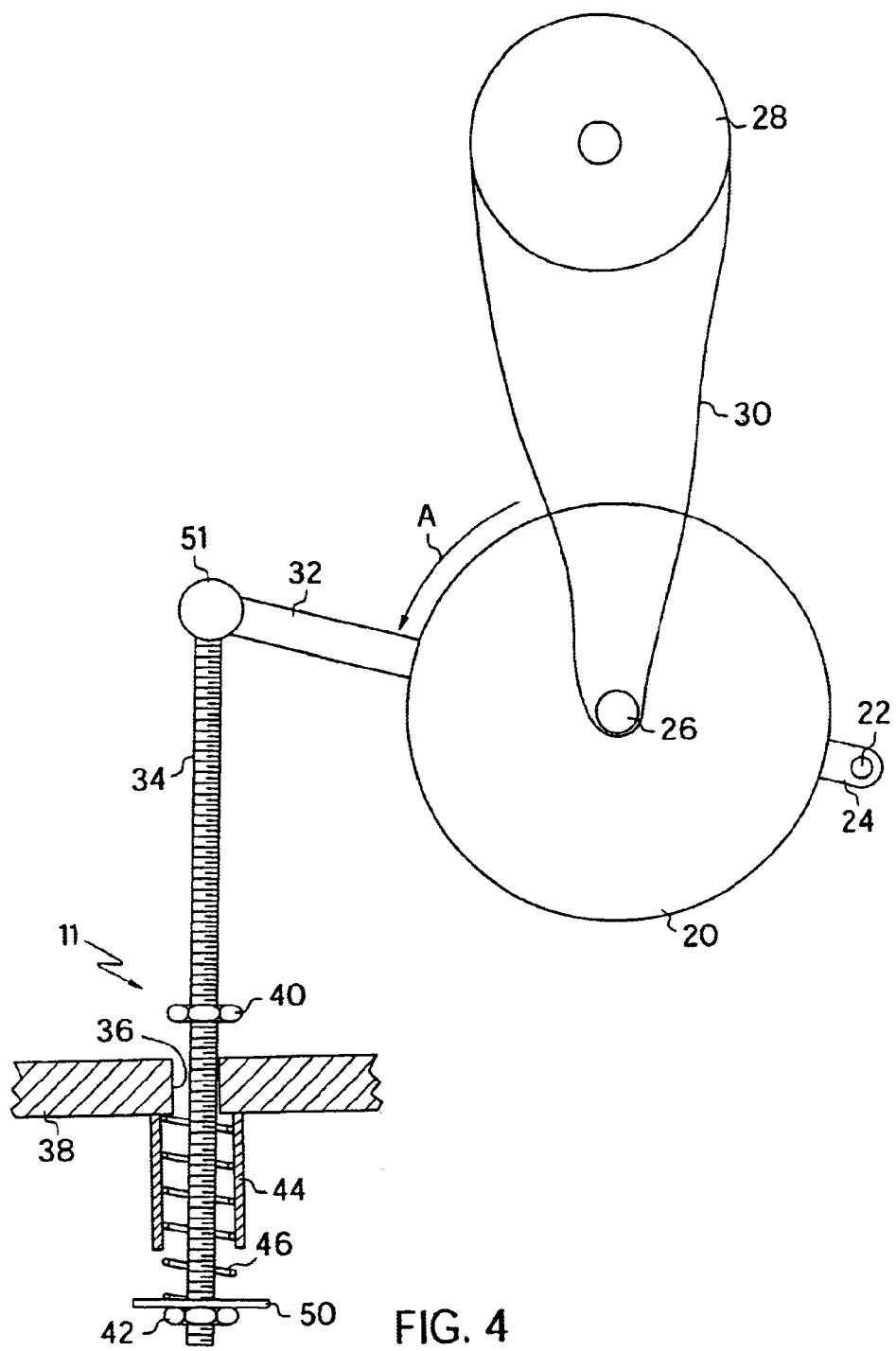
FIG. 4 is a schematic representation of the belt tensioning device of the present invention, shown in an un-tensioned state.
Figure 5:
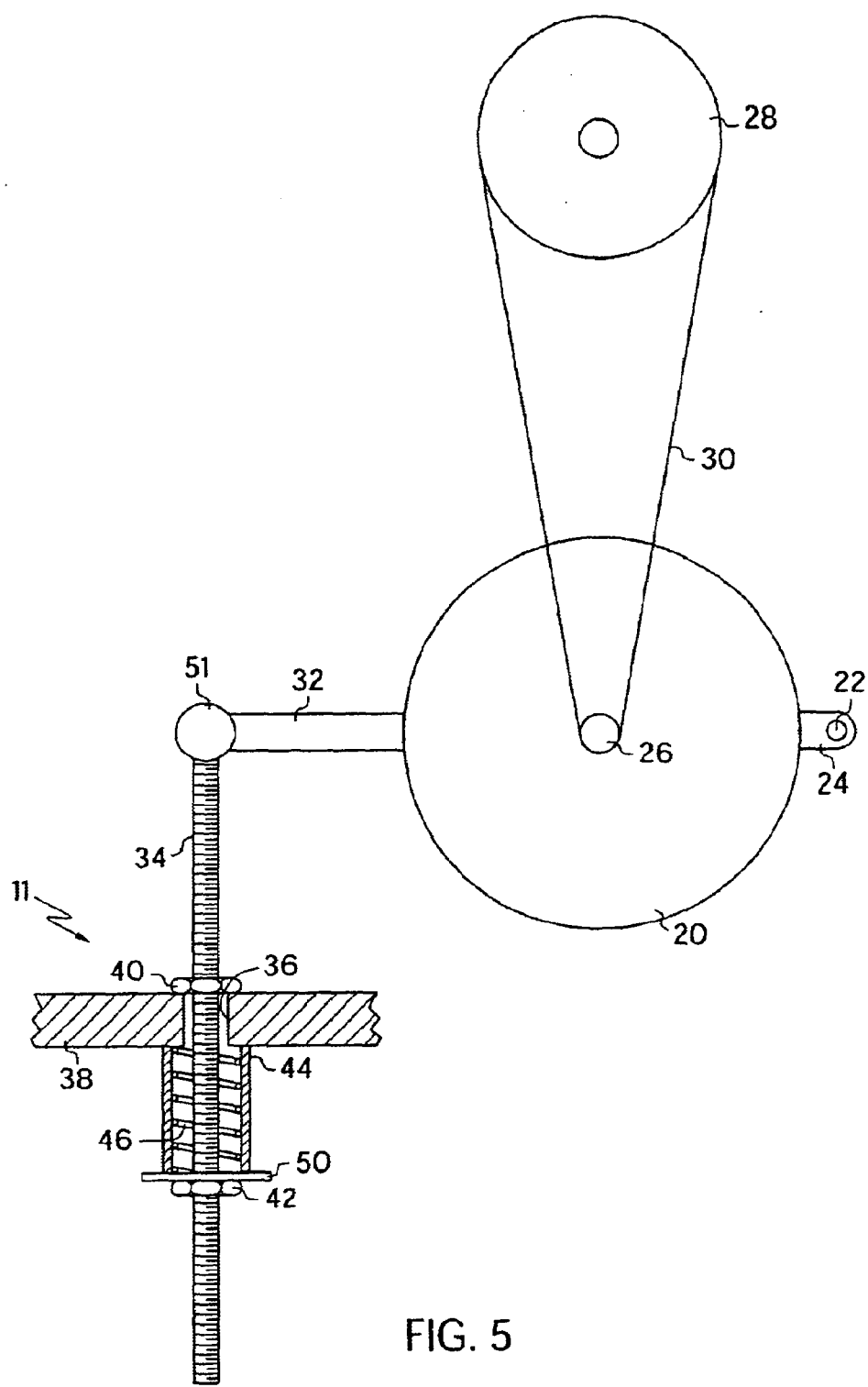
FIG. 5 is a schematic representation of the device of FIG. 3, shown in a fully tensioned state.

The belt tensioning device 11 includes an arm 32 that is coupled to the motor 20, and a threaded rod 34 is coupled to the arm 32. As shown in FIG. 3, in one embodiment the threaded rod 34 terminates in an eyelet 60 that receives a rod 62 therethrough, to couple the threaded rod and the arm 32. In FIGS. 4–5, the connection between the rod 34 and arm 32 is schematically illustrated as connection 51. The threaded rod 34 extends through an opening 36 in a wall 38. A lock nut 40 is threaded onto the threaded rod 34 on one side of the wall 38, and a nut 42 is threaded onto the rod 34 on the other side of the wall 38. The belt tensioning device 11 includes a spacer 44 which generally receives a spring 46 therein. The spring 46 in turn receives the threaded rod 34 therethrough. The spacer 44 is preferably a hollow tube, and a washer 50 is located between the nut 42 and the spacer 44.

In its state shown in FIG. 4, the belt tensioning device 11 is disengaged and the belt 30 is generally slack. In order to tension the belt 30, the nut 42 is threaded along the rod 34 towards the wall 38. As the nut 42 and washer 50 are moved along the rod 34, the nut and washer engage the spring 46 located inside the spacer 44, and begin to compress the spring 46. As the spring 46 is compressed, it exerts a reactive force on the nut 42 and washer 50. The reactive force causes the threaded rod 34 to be pulled through the wall 38 towards the wall 38, and the motor 20 is rotated about the pivot rod 22 in the direction of arrow A. This movement of the motor 20 causes the tension in the belt 30 to increase.

The nut 42 and washer 50 are continued to be advanced onto the threaded rod 34 towards the wall 38 (thereby further compressing the spring 46 and tensioning the belt 30) until the nut/washer engage the spacer 44 (FIG. 5). The spacer 44 provides a positive force feedback to let the user know that the nut/washer has engaged the spacer 44, and to stop advancing the nut 42 and washer 50 along the threaded rod 34. At this point, the desired tension in the belt 30 has been achieved. The lock nut 40 may then be threaded along the rod 34 towards the wall 38, until the lock nut 40 engages the wall 38, to further lock the belt tensioning device 11 in place. It should be noted that the rotation of the motor 20 in the direction of arrow A causes lateral movement of the rod 34 (i.e. left and right motion in FIGS. 4 and 5), and the opening 36 should be wide enough to accommodate the expected range of lateral movement. In one embodiment, the opening 36 is generally elliptical, and is wide enough accommodate the expected lateral movement of the rod 34.

The length of the spacer 44 and the spring constant of the spring 46 can be selected to ensure that the desired tension of the belt 30 is consistently and repeatedly achieved each time the belt tensioning device 11 is utilized. Accordingly, the belt tensioning device 11 of the present invention tightens the belt 30 to a specified tension without requiring the use of gauges or other special tools, and the belt tensioning device 11 need only be assembled in the above-described manner to ensure that the belt 30 is properly tensioned. Furthermore, the spring 46 of the present invention is located between the wall 38 and the washer 50. Because the wall 38 is a fixed component, the belt tensioning device 11 provides a high degree of control over the spring deflection, and thereby the tension in the belt 30. Additionally, the belt tensioning device 11 minimizes bending moments in the system.

In an alternate embodiment, the arm 32 may comprise a variety of lever arms (not shown) to change the leverage of the arm 32 on the rotation of the motor 20 (and thereby optimize the force on the belt 30), or to change the moment arm ratios in the system. Furthermore, a variety of lever arms may be used to change the rotation of the motor 20; that is, a lever arm may be provided to rotate the motor in the opposite direction of arrow A when the nut 42 is tightened down.

The present invention may be implemented in a wide variety of manners beyond the specific embodiment shown herein. For example, although the spring 46 is preferably received within the spacer 44, it may be located at a variety of locations outside of the spacer. Furthermore, the wall 38 may be replaced with any various type of anchor mechanism, so long as the anchor mechanism provides a surface for opposing the spring force and/or the force exerted by the spacer 44 when the nut 42 and washer 50 engage the spacer. Furthermore, besides the nut/threaded rod arrangement, nearly any mechanism or member besides the nut that can clamp onto or otherwise engage a rod or other member while compressing the spring 46, may be used. Finally, although the spacer 44 is preferably located around the threaded rod 34, the spacer need not be a tube, and need not be located around the threaded rod.

In a preferred embodiment, the uncompressed length of the spring 46 is about 18 mm, the spring constant is about 28 N/mm, and the outer diameter of the spring is about 12 mm. The spacer 44 is about 12 mm long in this embodiment such that the spring 46 is compressed by 6 mm. The reaction force (i.e., the force exerted by the spring 46 on the washer 50) is this case is expected to be about 168 N, which results in a belt tension of about 150 N. Of course, these specifications and dimensions are for one embodiment only, and a variety of sizes and shapes of the various components of the invention may be used without departing from the scope of the invention.

Figure 6:
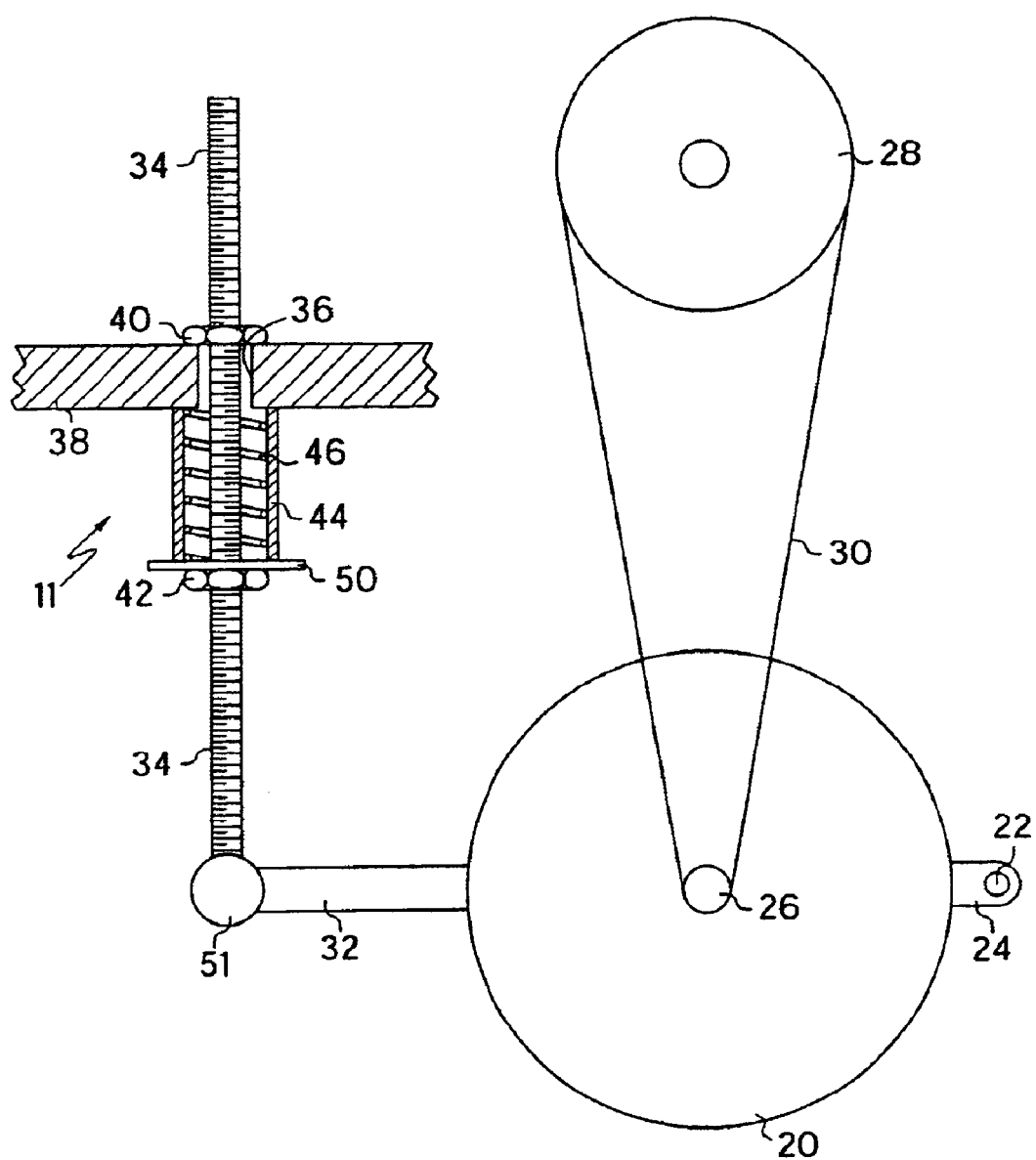
FIG. 6 is a schematic representation of the belt tensioning device of the present invention shown in an alternate location and in its fully tensioned state.

In some cases, due to space or accesiblity requirement, the belt tensioning device 11 may be located on the opposite side of the arm 32 from that shown in FIGS. 4–5. This embodiment is shown in FIG. 6.

Figure 7:
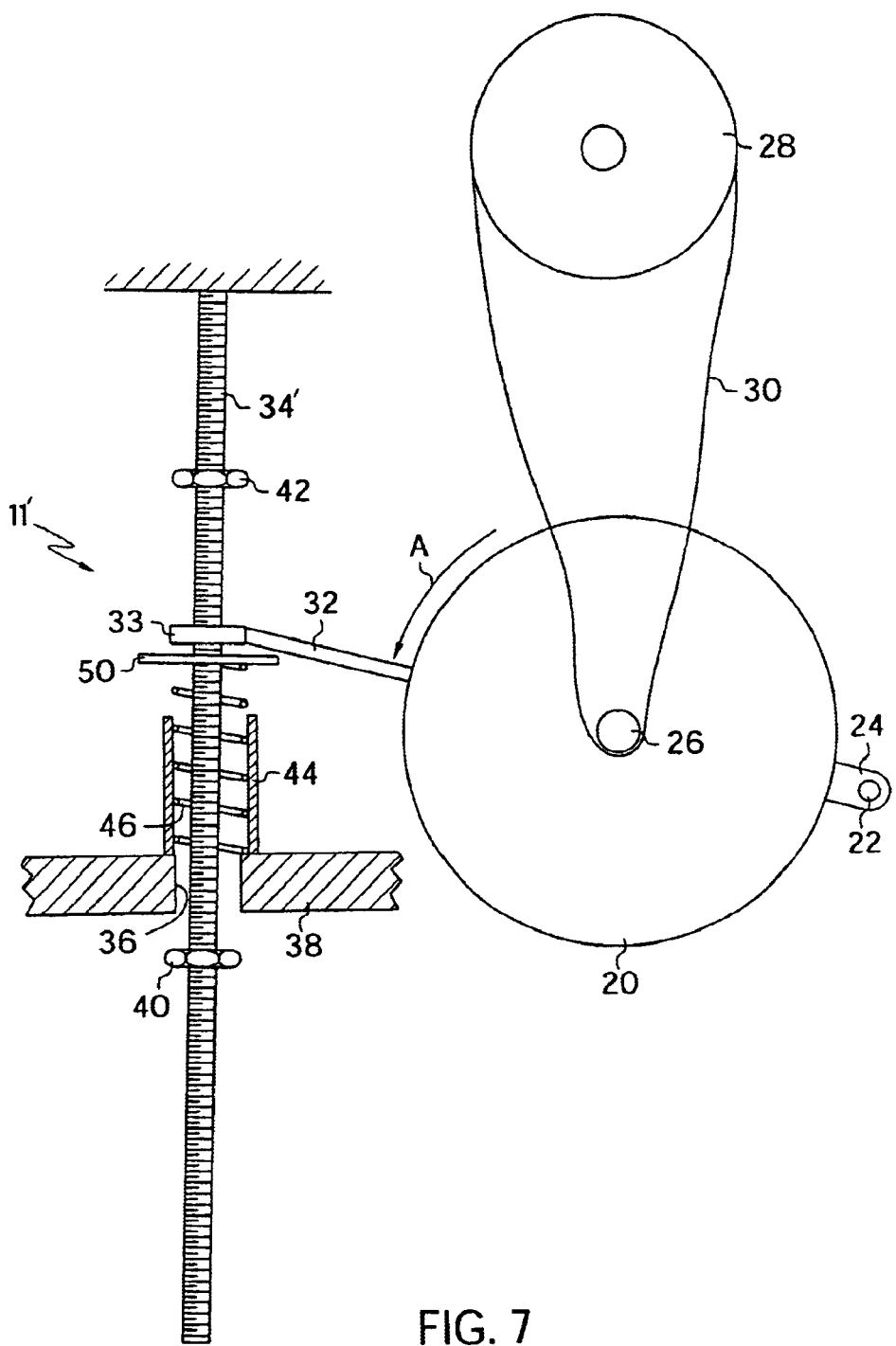
FIG. 7 is an alternate embodiment of the belt tensioning device of the present invention shown in its un-tensioned state.

FIG. 7 illustrates an alternate embodiment of the invention. The belt tensioning device 11' includes a threaded rod 34' that is anchored to the body of the machine. The arm 32 of the motor 20 is coupled to the threaded rod 34' by a collar 33 that fits loosely around the threaded rod 34'. The collar 33 is free to move up and down the length of the rod 34', and the collar 33 is preferably pivotably coupled to the arm 32 to allow the collar 33 to pivot relative to the arm as the collar moves along the length of the rod.

In order to tension the belt 30 in the device of FIG. 7, the nut 42 is threaded along the rod 34 towards the wall 36. The nut 42 then engages the collar 33 and washer 50 and urges them towards the wall 36. This causes the motor 20 to pivot in the direction of arrow A, thereby tensioning the belt 30. The sleeve 44 provides a force feedback when the washer 50 engages the sleeve 44 to provide an indication that the belt 30 is tensioned to the proper tension. The lock nut 40 may then be tightened against the wall 38 to lock the device 11' in place.

Figure 8:
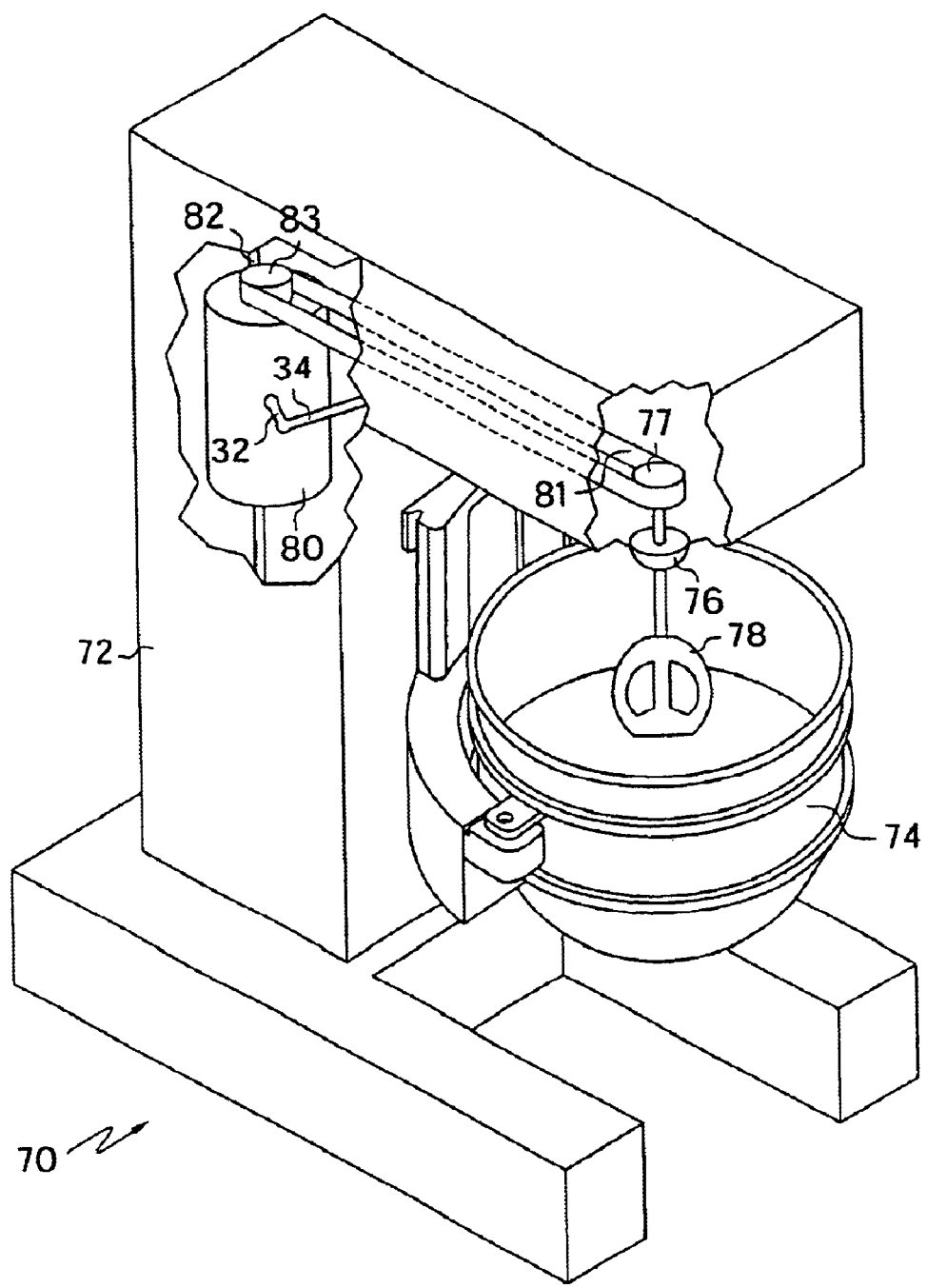
FIG. 8 is a perspective, partial cutaway view of a mixer including the belt tensioning device of the present invention.

Although the belt tensioning device 11 of the present invention is illustrated and described in conjunction with a slicer, it should be understood that the belt tensioning device may be used with nearly any system having a pivotable pulley with a belt passed around the pulley. For example, the belt tensioning device 11 may be used with a mixer 70 as shown in FIG. 8. The mixer 70 includes a mixer body 72, a mixer bowl 74, and a rotatable output component 76. The rotatable output component 76 can releasably receive a mixing element 78. The output component 76 is coupled to a pulley 77, which is in turn directly or indirectly coupled to the output pulley 83 of a motor 80 by a belt 81. In this manner the motor 80 can rotate the output component 76 and mixing element 78 to mix the contents of the bowl 74. The motor 80 is pivotably mounted onto a rod 82, and arm 32 and threaded rod 34 portions of the belt tensioning device 11, which can cause the motor 80 to pivot about rod 82 to tension the belt 81, can be seen. The remainder of the belt tensioning device is the same as the belt tensioning device 11 disclosed and described above.

Having described the invention in detail and by reference to the preferred embodiments, it will be apparent that modifications and variations thereof are possible without departing from the scope of the invention.

What is claimed is:

1. A slicer comprising:
   a slicer body having an anchor component;
   a rotatable blade coupled to said slicer body;
   a reciprocal tray for bringing a food product into and out of contact with said blade;
   a motor for driving said blade, said motor being pivotably mounted with respect to said slicer body and having an output pulley operatively connected to said blade by a belt and wherein said anchor component remains fixed when said motor pivots; and
   a belt tensioning device for said motor such that said belt is tightenable to a predetermined tension, the belt tensioning device including a threaded rod operatively coupled to said motor, said rod being located adjacent said anchor component, an adjustment nut threaded onto said threaded rod, a spring located adjacent said adjustment nut that exerts a reactive force against said adjustment nut when said adjustment nut is threaded in a first direction along said rod toward said anchor component to cause said motor to pivot, a spacer which interacts with said adjustment nut and said anchor component to limit advancement of said adjustment nut in said first direction and a lock nut threaded on said rod, wherein when said belt is tightened to said predetermined tension said lock nut and said adjustment nut are positioned so that movement of said threaded rod is prevented and said spacer is rigidly trapped between said adjustment nut and said anchor component.

2. A slicer comprising:

a slicer body having an anchor component;

a rotatable blade coupled to said slicer body;

a reciprocal tray for bringing a food product into and out of contact with said blade;

a motor for driving said blade, said motor being pivotably mounted with respect to said slicer body and having an output pulley operatively connected to said blade by a belt and wherein said anchor component remains fixed when said motor pivots; and a belt tensioning device for said motor such that said belt is tightenable to a predetermined tension, the belt tensioning device including a rod operatively coupled to said pulley, a member coupled to and movable along said rod, a spring that exerts a reactive force against said member when said member is moved in a first direction along said rod toward said anchor component, a spacer which interacts with said member and said anchor component to limit advancement of said member in said first direction and a locking member coupled to said rod, and wherein when said belt is tightened to said predetermined tension said locking member and said member are positioned so that movement of said rod is prevented and said spacer is rigidly trapped between said member and said anchor component.

3. The slicer of claim 2 wherein said rod is a threaded rod, and said member is a nut threaded onto said threaded rod.

4. The slicer of claim 2 wherein said pulley is located adjacent to said anchor component which has an opening formed therein, and wherein said rod extends through said opening.

5. The slicer of claim 4 wherein said anchor component is a wall.

6. The slicer of claim 4 wherein said spring is located between said member and said anchor component.

7. The slicer of claim 4 wherein said spacer is located between and in contact with said member and said anchor component.

8. The slicer of claim 4 wherein said first direction is towards said anchor component.

9. The slicer of claim 4 wherein said spring, said spacer, and said member are located on a first side of said anchor component, and wherein said locking component is located on a second side of said anchor component to secure said threaded rod in place.

10. The slicer of claim 2 wherein said rod extends through said spring.

11. The slicer of claim 2 wherein said rod slidably extends through said spacer.

12. The slicer of claim 2 wherein said spacer receives said spring therein.

13. The slicer of claim 2 wherein said pulley is pivotally mounted such that advancement of said member in said first direction causes said spring to be compressed, which in turn causes said pulley to be pivoted and the tension in said belt to thereby be increased.

14. The slicer of claim 2 further comprising an arm having a first end and a second end, said first end being coupled to said rod and said second end being coupled to said pulley.

15. The slicer of claim 2 wherein said spring is a coil spring.

16. The slicer of claim 2 wherein said spacer is trapped between said anchor component and said member when said spacer limits the advancement of said member is said first direction.

17. A slicer comprising:

a slicer body including an anchor component;

a rotatable blade coupled to said slicer body;

a reciprocal tray for bringing a food product into and out of contact with said blade;

a motor for driving said blade, said motor being pivotably mounted with respect to said slicer body and having an output pulley operatively connected to said blade by a belt; and a belt tensioning device for said motor such that said belt is tightenable to a predetermined tension, the belt tensioning device including a rod operatively coupled to said pulley, a member coupled to and movable along said rod, a spring that exerts a reactive force against said member when said member is moved in a first direction along said rod toward said anchor component, a spacer which interacts with said member to limit advancement of said member in said first direction and a locking member coupled to said rod, wherein said spacer slidably receives said rod therethrough, when said belt is tightened to said predetermined tension said locking member and said member are positioned so that movement of said rod is prevented and said spacer is rigidly trapped between said member and said anchor component.

18. The slicer of claim 17 wherein said spacer receives said spring therein.

19. A slicer comprising:

a slicer body including an anchor component;

a rotatable blade coupled to said slicer body;

a reciprocal tray for bringing a food product into and out of contact with said blade;

a motor for driving said blade, said motor being pivotably mounted to said slicer body and having an output pulley operatively connected to said blade by a belt; and a belt tensioning device for said motor such that said belt is tightenable to a predetermined tension, the belt tensioning device including a rod operatively coupled to said pulley, a member coupled to and movable along said rod, a spring component that exerts a reactive force against said member when said member is moved in a first direction along said rod toward said anchor component, said spring component being compressed in a direction parallel to the movement of said member when said member is moved in said first direction to exert said reactive force, a spacer which interacts with said member to limit advancement of said member in said first direction and a locking member coupled to said rod, wherein when said belt is tightened to said predetermined tension said locking member and said member are positioned so that movement of said rod is prevented and said spacer is rigidly trapped between said member and said anchor component.

20. A slicer comprising:

a slicer body having a stationary anchor component;

a rotatable blade coupled to said slicer body;

a reciprocal tray for bringing a food product into and out of contact with said blade;

a motor mounted for pivoting movement relative to said slicer body, wherein said motor drives an output pulley operatively connected to said blade and wherein said output pulley pivots with said motor; and a belt tensioning system associated with said motor such that a belt passed around said output pulley is in a tensioned state, said belt tensioning system including:

a rod operatively coupled to said motor;

a first locking member, a spacer and a spring associated with said rod and located on a first side of said stationary anchor component, and a second locking member associated with said rod and located on said second side of said stationary anchor component, wherein said first locking member and said spacer interact with said rod and said stationary anchor component to prevent movement of said rod toward a second side of said stationary anchor component, wherein said second locking member interacts with said rod and said stationary anchor component to prevent movement of said rod toward said first side of said stationary anchor component, and wherein said spring is in a compressed and stationary state between said first locking member and said stationary anchor component.

21. The slicer of claim 20 wherein said spring is disposed around said rod and within said spacer.

22. A slicer comprising:

a slicer body having an anchor component;

a rotatable blade coupled to said slicer body;

a reciprocal tray for bringing a food product into and out of contact with said blade;

a motor connected to drive said blade via a belt associated with a pulley, the pulley movable with respect to the slicer body for placing the belt in a tensioned state; and a belt tensioning system associated with said pulley, said belt tensioning system including:

a rod operatively coupled to said pulley;

a first locking member, a spacer and a spring associated with said rod and located on a first side of said anchor component, and a second locking member associated with said rod and located on a second side of said anchor component, wherein said first locking member and said spacer interact with said rod and said anchor component to prevent movement of said rod toward said second side of said anchor component, wherein said second locking member interacts with said rod and said anchor component to prevent movement of said rod toward said first side of said anchor component, and wherein said spring is in a compressed and stationary state between said first locking member and said anchor component.

23. The slicer of claim 22 wherein said spring is disposed around said rod and within said spacer.

* * * * *